(12) United States Patent
Kraft et al.

(10) Patent No.: US 6,418,453 B1
(45) Date of Patent: Jul. 9, 2002

(54) NETWORK REPOSITORY SERVICE FOR EFFICIENT WEB CRAWLING

(75) Inventors: Reiner Kraft, Gilroy; Michael Lawrence Emens, San Jose, both of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/433,118

(22) Filed: Nov. 3, 1999

(51) Int. Cl.[7] .............................................. G06F 17/30
(52) U.S. Cl. .......................... 707/200; 707/1; 707/10; 707/104.1; 707/201; 707/203; 709/201; 709/203; 709/223; 709/224; 709/225; 709/226
(58) Field of Search .......................... 707/10, 3, 104.1, 707/100, 1, 200, 201, 203; 709/201, 203, 223, 224, 225, 226

(56) References Cited

U.S. PATENT DOCUMENTS

| | | | |
|---|---|---|---|
| 5,845,290 A | | 12/1998 | Yoshii ......................... 707/104 |
| 5,860,071 A | * | 1/1999 | Ball et al. .................... 707/100 |
| 5,890,152 A | * | 3/1999 | Rapaport et al. .............. 707/6 |
| 6,038,610 A | * | 3/2000 | Belfiore et al. ............. 709/300 |
| 6,073,135 A | * | 6/2000 | Broder et al. ................ 707/100 |
| 6,182,085 B1 | * | 1/2001 | Eichstaedt et al. .......... 707/104 |
| 6,249,795 B1 | * | 6/2001 | Douglis ........................ 707/511 |
| 6,263,364 B1 | * | 7/2001 | Najork et al. ................ 709/217 |
| 6,269,370 B1 | * | 7/2001 | Kirsch .......................... 707/10 |
| 6,292,894 B1 | * | 9/2001 | Chipman et al. ............ 713/168 |
| 6,295,529 B1 | * | 9/2001 | Corston-Oliver et al. ...... 707/3 |

OTHER PUBLICATIONS

Douglis, F. et al., The AT&T internet difference engine: tracking and viewing changes on the Web, AT&T Labs–Research Technical Report #97.23.1, Apr. 14, 1997.

* cited by examiner

Primary Examiner—John Breene
Assistant Examiner—Cheryl R. Lewis
(74) Attorney, Agent, or Firm—Lumen Intellectual Property Services, Inc.

(57) ABSTRACT

A network repository service supplements the functions of a web server to enable an increase in the efficiency of web crawling. The repository service: (a) automatically maintains a file modification list that contains the names of files on the server that have been modified (i.e., added, deleted, or otherwise modified), together with the date and time of the file modification; and (b) provides a requesting crawler with the file modification list (or a portion of the list corresponding to a time period specified by the crawler). The repository service may also (c) limit or restrict access privileges of crawlers that do not request the file modification list prior to crawling, thereby protecting the server from overcrawling. The repository service enables a crawler to request the file modification list, and avoid unnecessarily recrawling files that have not been modified since its last visit, thereby preventing considerable waste of time, network bandwidth, server processing resources, and crawler processing resources. Using the file modification list, the crawler can remove all prior references to deleted files, and efficiently recrawl only those files that have been added or changed since the crawler last visited the web server.

15 Claims, 1 Drawing Sheet

NETWORK REPOSITORY SERVICE FOR EFFICIENT WEB CRAWLING

CROSS-REFERENCE TO RELATED APPLICATIONS

This application is related to U.S. patent application Ser. No. 09/433,116, pending, filed concurrently herewith, entitled "Network Repository Service Directory for Efficient Web Crawling," by the same inventors, which application is incorporated herein by reference in its entirety.

FIELD OF THE INVENTION

The present invention relates generally to searching and gathering information on computer networks. More specifically, it relates to improved techniques for gathering large amounts of information from a large number of resources on a network, e.g., web crawling.

BACKGROUND OF THE INVENTION

The world wide web (or simply, "the web") has enjoyed explosive growth in recent years, and now contains enormous amounts of information. This information is not centrally stored, but is distributed throughout millions of web servers. Moreover, the information is not static, but is constantly changing as web servers update, add, delete, or otherwise modify the information they make available to the network.

Popular web search engines allow users to quickly search the dynamic, distributed information on the web. Because searching the web directly would take an enormous amount of time, these search engines search a centralized index that summarizes the information stored on the web. An essential component of this approach to web searching is the task of gathering information from web servers ("web crawling") and creating the searchable index from the gathered information.

Conventional web crawling typically involves a systematic exploration of the web to discover and gather information. Because the amount of information on the entire web is so large, web crawling consumes a proportionately large amount of time and network bandwidth, and places a large burden on both the crawlers and the servers. Moreover, because information on the web is constantly and unpredictably changing, the entire web crawling procedure is periodically repeated in order to keep the index information current. If this recrawling is not performed frequently enough, the web index will contain a large amount of obsolete information for some web sites ("undercrawled sites") whose content changes often. On the other hand, if recrawling is performed too frequently, valuable computational and network resources are wasted because a large portion of information has not changed at many web sites ("overcrawled sites").

Conventional web crawling techniques also have the problem that they often do not discover all the information actually available on the web. Their normal strategy for discovering new information is to examine the hyperlinks within known documents. Some information, however, may not have direct hyperlinks from other documents, or may only have direct hyperlinks from other undiscovered documents. As a result, this information is not discovered, gathered, or included into the index used by the search engine.

The present inventors are not aware of any existing techniques by others that effectively address these problems.

U.S. Pat. No. 5,860,071 and ATT Labs Tech. Report #97.23.1 discuss the AT&T Internet Difference Engine (AIDE). The primary purpose of AIDE is to track changes to web documents and display the update information to a user in a personalized manner. This and similar techniques are directed to the problem experienced by users who are browsing large collections of changing web documents, and want to be automatically notified when certain information of interest to them has changed. It is not directed to the problems associated with web crawling, and does not teach any solution to these problems.

SUMMARY OF THE INVENTION

To address the above problems with the current state of the art, the present inventors have developed a network repository service for efficient web crawling. The repository service supplements the functions of a web server to enable an increase in the efficiency of web crawling. In particular the repository service: (a) automatically maintains a file modification list that contains the names of files on the server that have been modified (i.e., added, deleted, or otherwise modified), together with the date and time of the file modification; and (b) provides a requesting crawler with the file modification list (or a portion of the list corresponding to a time period specified by the crawler). The repository service may also (c) limit or restrict access privileges of crawlers that do not request the file modification list, thereby protecting the server from overcrawling. The repository service enables a crawler to request the file modification list, and avoid unnecessarily recrawling files that have not been modified since its last visit, thereby preventing considerable waste of time, network bandwidth, server processing resources, and crawler processing resources. Using the file modification list, the crawler can remove all prior references to deleted files, and efficiently recrawl only those files that have been added or changed since the crawler last visited the web server.

The present technique solves the problems associated with both overcrawling and undercrawling. Because crawlers that request the file modification list will not unnecessarily recrawl unmodified files, they will no longer overcrawl web servers whose data is infrequently modified. Crawlers that do not request the file modification list, on the other hand, will have their access limited or restricted, preventing them from overcrawling the web server. The problem of undercrawling is solved by the present technique by virtue of the increased efficiency in crawling. Because all unnecessary crawling is eliminated, resources are made available for more frequent crawling of information that actually is changing, as well as for other uses. Consequently, any index produced from the information gathered by the crawler will have more current information. The present technique also has the advantage that it informs the crawlers of all new web content. As a result, web crawlers will not miss documents that are not linked to known documents, and the information gathered by the crawler will be more complete.

DESCRIPTION OF THE PREFERRED EMBODIMENT

Figure 1:
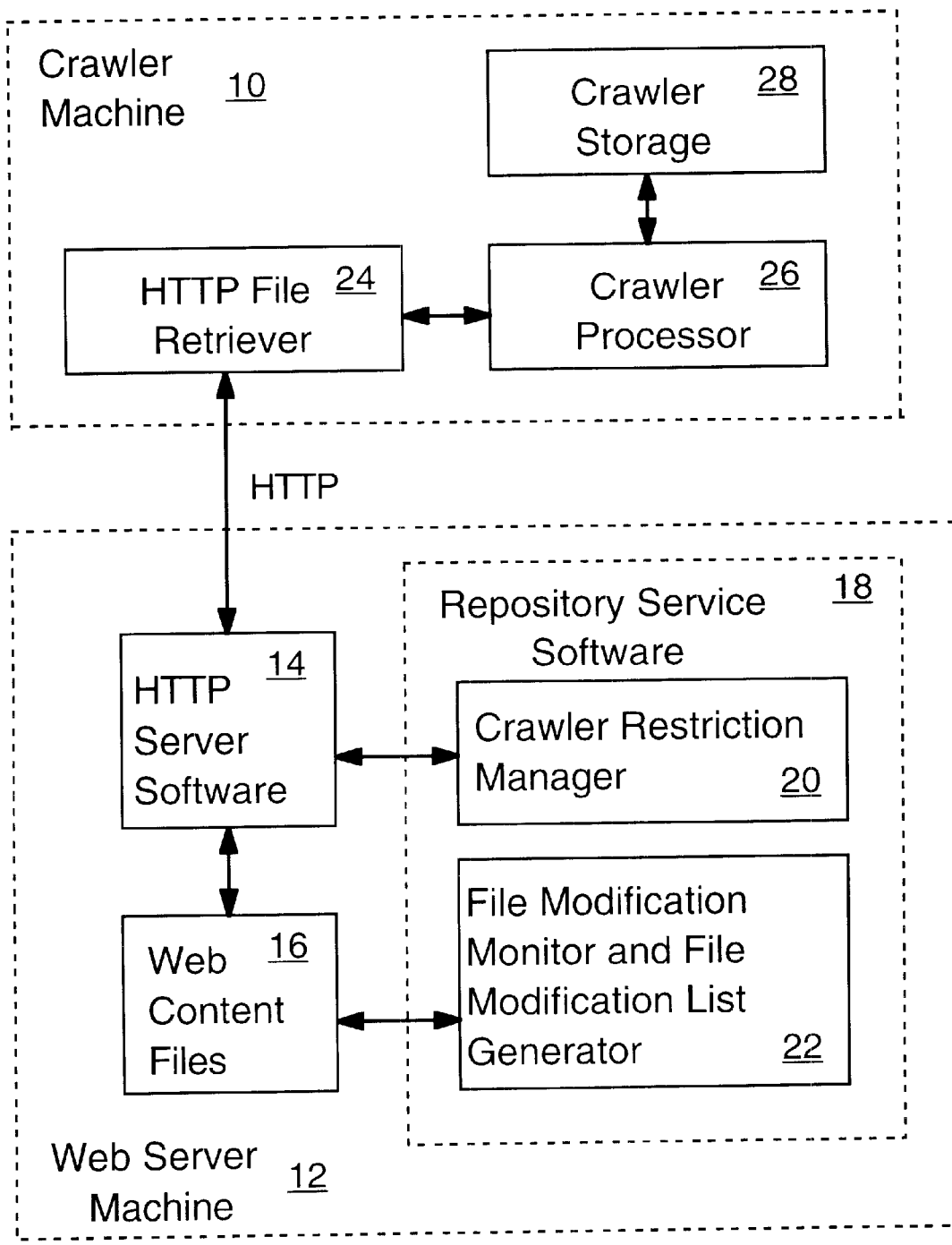
FIG. 1 is a block diagram illustrating a system used to implement an embodiment of the present invention.

A preferred embodiment of the present invention will now be described in relation to FIG. 1. A web crawler 10 is programmed to navigate the web and gather information from various web servers, such as web server machine 12. The crawler 10 and server 12 preferably communicate over a conventional computer network using hypertext transfer protocol (HTTP) or other standard protocol. With the exception of the distinctive features described below, the crawler and server otherwise operate using standard techniques known in the art. Web server 12 contains HTTP server software 14, web content files 16, and repository service software 18 (preferably implemented as a web server plug-in). In response to HTTP requests from crawler machine 10 (or other HTTP clients), HTTP server software 14 obtains a requested portion of web content files 16 and transmits them back to the crawler using conventional techniques.

The repository service 18 comprises a file modification monitor and file modification list generator 22 that monitors any modifications (i.e., additions, deletions, or other modifications) to the web content files 16. Preferably, this monitoring is performed through interrupt-driven notification by a resident operating system whenever one of the web content files is modified. Alternatively, the monitoring can also be performed by periodic examination of the files and file directories. The file modification monitor and file modification list generator 22 also generates a file modification list that includes a history of modifications to web content files 16. In a preferred embodiment, the file modification list comprises a plurality of entries, each of which comprises a path name of a modified file, a time/date stamp of the modification, and a modification type (e.g., file created, file deleted, or file changed). As web content files are added, removed, or otherwise changed, entries corresponding to these modifications are added to the file modification list. The generated file modification list is then stored as one of the web content files. Preferably, the file modification list is stored as separate files, each of which contains the modifications during a particular time period, e.g., a day or a week. The file modification list can be given a standardized name and stored in the server's root directory.

The crawler machine 10 comprises an HTTP file retriever 24 directed by a crawler processor 26. Retrieved files are processed by crawler processor 26, and index information is stored in crawler storage 28 for further processing or use by a search engine. Because the web content files can change, crawler machine 10 normally has no a priori knowledge of the web content files 16 currently stored on server 12. Consequently, if it were to use conventional crawling techniques, crawler 10 would again submit HTTP requests to explore the web content files in an attempt to discover and gather all the files—regardless of whether or not it has previously indexed the web content 16. This wasteful crawling is avoided, however, by taking advantage of the features of the repository service software 18 on web server 12. Thus, a crawler 10 that is savvy to the capabilities of the repository service software will first request from the server 12 the file modification list (or lists) containing the modification information since crawler last visited server 12. Server 12 responds with the requested file(s), and crawler processor 26 analyzes the files. Using the file modification list, the crawler removes from crawler storage 28 all prior references to files that have been deleted, and then recrawls only those files that have been added or changed since the crawler last visited the web server. It is clear that this technique optimizes recrawling and does not waste valuable resources performing unnecessary recrawling. It will also be noted that crawler 10 can request a list of all web content files currently available on web server 12, as may be useful in the event that the crawler is visiting the server for the first time.

It will be appreciated that not all crawlers will necessarily be savvy to the repository service present on server 12. These crawlers will continue to waste resources performing unnecessary recrawling. To prevent or limit this waste of resources, the repository service software includes a crawler restriction manager 20 that recognizes overcrawling and enables server software 14 to limit or restrict such activity. When a crawler fails to request the file modification list, and then proceeds to request a large proportion of the web content files 16, to make a very large number of requests in a very short time interval, or to make requests that systematically mine the web content files 16, the crawler restriction manager 20 detects this activity. The identified crawler is then added to a restriction or deny list, depending on the severity and nature of the overcrawling. Because the server software 14 checks this restriction or deny list prior to fulfilling all requests, if such a crawler persists in overcrawling, its subsequent access to the server web files will be restricted or denied entirely.

In addition to the obvious benefits of improving crawling efficiency, it will also be appreciated that the present technique also has the advantage that it informs the crawlers of all new web content on the web server. As a result, web crawlers will not miss documents that are not linked to known documents, and the information gathered by the crawler will be more complete.

It will be appreciated by those skilled in the art that the essential techniques of the present invention may be implemented in various alternate ways other than the specific example shown above. For example, rather than storing the file modification list as one of the web content files, it can be stored in a database format that can be queried by the crawler 10 via a database server feature of the repository service software. In this implementation, the crawler 10 sends its request for the file modification list to the database server rather than to the HTTP server. It will also be appreciated that the file modification list may contain more detailed information relating to the changes to the web content files, and that the database server can be used to provide such information to crawlers.

In another aspect of the invention, the techniques described above are implemented in the form of a program of instructions executable by the web server machine. Using techniques well known in the computer arts, such a program is tangibly embodied within a computer program storage device accessible by the web server machine, e.g., within a memory or other media storage device of the web server machine.

Although the present invention has been shown and described with reference to a preferred embodiment, equivalent alterations and modifications will occur to those skilled in the art upon reading and understanding this specification. The present invention includes all such equivalent alterations and modifications and is limited only by the scope of the following claims.

What is claimed is:

1. In a computer network comprising a web server machine and a web crawler machine, a method comprising:
   a) automatically maintaining a file modification list on the web server, wherein the file modification list comprises a plurality of modification entries describing modifications made to web content files stored on the web server machine, wherein each modification entry comprises a file name, a file modification time, and a file modification type;
   b) transmitting from the web crawler machine to the web server machine a request for file modification information, wherein the request comprises a last visited time indicating when the web crawler machine last visited the web server machine;
   c) generating the requested file modification information and transmitting the requested file modification information to the web crawler machine, wherein the requested file modification information comprises file names corresponding to file modification times later than the last visited time of the web crawler machine;
   d) generating from the requested file modification information transmitted to the web crawler machine a list of new and changed web content files stored on the web server machine; and
   e) transmitting from the web crawler machine to the web server machine requests for the new and changed web content files.

2. The method of claim 1 wherein automatically maintaining the file modification list comprises detecting a modification to a web content file and adding a corresponding modification entry to the file modification list.

3. The method of claim 1 wherein generating the requested file modification information comprises identifying modification entries having file modification times later than the last visited time of the web crawler machine and collecting modified file names corresponding to the identified entries.

4. In a web server machine, a method comprising:
   a) automatically maintaining a file modification list, wherein the file modification list comprises a plurality of modification entries describing modifications made to web content files stored on the web server machine, wherein each modification entry comprises a file name, a file modification time, and a file modification type;
   b) receiving from a web crawler machine a request for file modification information, wherein the request comprises a last visited time indicating when the web crawler machine last visited the web server machine;
   c) generating file modification information from the file modification list, wherein the generated file modification information comprises file names in the file modification list, wherein the file names correspond to file modification times later than the last visited time of the web crawler machine;
   d) sending the requested file modification information from the web server machine to the web crawler machine;
   e) receiving from the web crawler machine requests for modified web content files stored on the web server machine; and
   f) sending the modified web content files to the web crawler machine.

5. The method of claim 4 wherein automatically maintaining the file modification list comprises detecting a modification to a web content file and adding a corresponding modification entry to the file modification list.

6. The method of claim 4 wherein the generated file modification information comprises file modification types corresponding to the file names in the generated file modification information.

7. In a web crawler machine, a method comprising:
   a) transmitting to a web server machine a request for file modification information, wherein the request comprises a last visited time indicating when the web crawler machine last visited the web server machine;
   b) receiving the requested file modification information from the web server machine, wherein the file modification information comprises a list of modified web content files stored on the web server machine, wherein the modified web content files are web content files that have modification times later than the last visited time of the web crawler machine;
   c) generating from the requested file modification information a list of new and changed web content files stored on the web server machine; and
   d) transmitting from the web crawler machine to the web server machine requests for the new and changed web content files.

8. The method of claim 7 wherein generating from the requested file modification information a list of new and changed web content files stored on the web server machine comprises identifying file modification types in the list of modified web content files matching a new file modification type and a changed file modification type.

9. The method of claim 7 further comprising generating from the requested modification information a list of deleted web content files on the web server machine.

10. A program storage device accessible by a web server machine, tangibly embodying a program of instructions executable by the web server machine to perform method steps for a repository service, the method steps comprising:
   a) automatically maintaining a file modification list, wherein the file modification list comprises a plurality of modification entries describing modifications made to web content files stored on the web server machine, wherein each modification entry comprises a file name, a file modification time, and a file modification type;
   b) receiving from a web crawler machine a request for file modification information, wherein the request comprises a last visited time indicating when the web crawler machine last visited the web server machine;
   c) generating file modification information from the file modification list, wherein the generated file modification information comprises file names in the file modification list, wherein the file names correspond to file modification times later than the last visited time of the web crawler machine;
   d) sending the requested file modification information from the web server machine to the web crawler machine;
   e) receiving from the web crawler machine requests for modified web content files stored on the web server machine; and
   f) sending the modified web content files to the web crawler machine.

11. The device of claim 10 wherein automatically maintaining the file modification list comprises detecting a modification to a web content file and adding a corresponding modification entry to the file modification list.

12. The device of claim 10 wherein the generated file modification information comprises file modification types corresponding to the file names in the generated file modification information.

13. A computer network system comprising a web server machine and a web crawler machine connected to the web server machine, wherein:
   a) the web server automatically maintains a file modification list, wherein the file modification list comprises a plurality of modification entries describing modifications made to web content files stored on the web server machine, wherein each modification entry comprises a file name, a file modification time, and a file modification type;

b) the web crawler machine transmits to the web server machine a request for file modification information, wherein the request comprises a last visited time indicating when the web crawler machine last visited the web server machine;

c) the web server machine generates the requested file modification information and transmits the requested file modification information to the web crawler machine, wherein the requested file modification information comprises file names corresponding to file modification times later than the last visited time of the web crawler machine;

d) the web crawler machine generates from the requested file modification information transmitted to the web crawler machine a list of new and changed web content files stored on the web server machine; and e) the web crawler machine transmits to the web server machine requests for the new and changed web content files.

14. The system of claim 13 wherein the web server machine automatically maintains the file modification list in part by detecting a modification to a web content file and adding a corresponding modification entry to the file modification list.

15. The system of claim 13 wherein the web server machine generates the requested file modification information in part by identifying modification entries having file modification times later than the last visited time of the web crawler machine and collecting modified file names corresponding to the identified entries.

* * * * *